US 6,731,090 B1

(12) United States Patent
Tanaka et al.

(10) Patent No.: US 6,731,090 B1
(45) Date of Patent: May 4, 2004

(54) METHOD AND SYSTEM FOR NUMERICAL CONTROL OF MACHINE TOOL

(75) Inventors: Takahisa Tanaka, Tokyo (JP); Kazuo Mizutani, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/070,861

(22) PCT Filed: Dec. 17, 1999

(86) PCT No.: PCT/JP99/07108

§ 371 (c)(1),
(2), (4) Date: Mar. 12, 2002

(87) PCT Pub. No.: WO01/44882

PCT Pub. Date: Jun. 21, 2001

(51) Int. Cl.[7] .................................................. B25J 9/18
(52) U.S. Cl. .................... 318/568.11; 318/569; 318/573
(58) Field of Search ........................... 318/568.11, 573, 318/569, 568.12

(56) References Cited

U.S. PATENT DOCUMENTS

| 5,544,046 A | | 8/1996 | Niwa | |
|---|---|---|---|---|
| 6,097,168 A | * | 8/2000 | Katoh et al. | 318/568.11 |

FOREIGN PATENT DOCUMENTS

| JP | SHO 63-26707 | 2/1988 |
|---|---|---|
| JP | A 1-127252 | 5/1989 |
| JP | HEI 4-100122 | 4/1992 |
| JP | A 5-250002 | 9/1993 |
| JP | A 5-134734 | 12/1996 |

* cited by examiner

Primary Examiner—Rita Leykin
(74) Attorney, Agent, or Firm—Sughrue Mion, PLLC

(57) ABSTRACT

A numerical value control system that controls a machine tool, by calculating a move command from a work program or a work data for a numerical value control unit, and directly inputting the move command to a servo control section (103) within the numerical value control unit (100) from the outside of the numerical value control unit (100). The numerical value control system comprises at the outside of the numerical value control unit: an analyzing unit (111) which analyzes a work program or a work data; and an interpolating unit (112) which carries out interpolation for each axis in a position control period of the servo control section based on output information from the analyzing unit (111) and cut conditions, where by the numerical value control system controls a machine tool by directly inputting a move command of a binary format prepared in advance by the interpolating unit (112), to the servo control section (103) within the numerical value control unit (100).

8 Claims, 14 Drawing Sheets

FIG.11

G00 G90 X120. Y100.;
G94 S1000;
G65 P100, R1; ⎤
G65 P101, R1; ⎦ CONTROL BASED ON BINARY PROGRAM
G00 X120. Y150.;
M30;
%

METHOD AND SYSTEM FOR NUMERICAL CONTROL OF MACHINE TOOL

TECHNICAL FIELD

This invention relates to a numerical value control processing method and a numerical value control system for a machine tool.

BACKGROUND ART

Along the increasing complexity and higher precision in the shapes of products, the frequency of using a CAD (Computer Aided Design) system and a CAM (Computer Aided Manufacturing) system has increased in order to efficiently prepare work programs of numerical value control units for machine tools. In the work programs prepared by using the CAD/CAM systems, there is a case where command blocks of short move quantity like a few millimeters or less are continuously disposed at portions like curves.

According to a conventional general numerical value control unit, a work program analyzing section analyzes the contents of a program commanded by a block, each time when the command information is read by one block. Then, a machine control section controls a machine movable part by carrying out interpolation and acceleration/deceleration processing.

In the case of a normal work program, a numerical value control unit analyzes a program in advance in the work program analyzing section, and a status that a result of the analysis is stored in a data buffer is maintained. However, in the case of a work program in which command blocks of short move quantity like a few millimeters or less are continuously disposed, the machine control section executes each command block faster than the work program analyzing section analyzes the program. As a result, there occurs such a phenomenon that the data inside the data buffer is kept consumed, and the data becomes empty in the data buffer.

As explained above, when a short command block immediately before has been executed in a short time, the next command is not in time. When the numerical value control unit cannot analyze the program in time, the forwarding of a tool between the blocks stops temporarily, and a cutter mark is attached to a product. This brings about the aggravation of the product quality. Further, this also gives bad effects to the production efficiency, such as the cycle time becomes longer.

For avoiding the temporary stopping of the tool between the blocks, according to the conventional numerical value control unit, it is necessary to lower the speed of forwarding the tool in line with the program analysis capacity of the numerical value control unit. This results in not being able to achieve the high-speed processing performance of the machine tool.

In order to solve the above problems, numerical value control (NC) system has been proposed as disclosed in Japanese Patent Application Laid-open Publication No. 63-26707. This numerical value control system will be explained below with reference to FIG. 13. This numerical value control system comprises a numerical value control unit 10, a buffer memory unit 12 installed separately from or attached to the numerical value control unit 10, for storing NC work data, a work program supplying unit 14 for supplying a work program, a high-speed NC data preparing unit 16 for converting a predetermined NC work data into a high-speed NC work data according to a high-speed work command from the NC work program supplied from the work program supplying unit 14, and a group of driving motors 18 that are operated according to NC work command data supplied from the numerical value control unit 10.

The work program supplying unit 14 and the high-speed NC data preparing unit 16 are connected to each other via an interface unit 20. Similarly, the high-speed NC data preparing unit 16 and the buffer memory unit 12 are connected to each other via a similar interface unit. The high-speed NC data preparing unit 16 has a data receiving section 24, a high-speed NC data processing section 26, and a data transmitting section 28, as shown in FIG. 14.

A work program supplied from the work program supplying unit 14 includes both an NC work command for executing an NC work in a normal or standard speed mode and an NC work command for executing an NC work in a high-speed mode. When an NC work program that includes a high-speed work command has been supplied to the data receiving section 24 of the high-speed NC data preparing unit 16, the high-speed NC data preparing unit 16 transmits an NC command data to the data transmitting section 28 via the high-speed NC data processing section 26 or by bypassing the high-speed NC data processing section 26. In the case of a high-speed mode, the high-speed NC data processing section 26 interpolates the NC command data, and converts the data into a binary move command data that can be directly supplied to a servo control section within the numerical value control unit 10.

The high-speed NC data preparing unit 16 is a unit which prepares the data that can be directly supplied to the servo control section within the numerical value control unit 10, in advance at high speed by a processing unit that is separate from the numerical value control unit 10. This system is a numerical value control system that can omit all the interpolation processing of the numerical value control unit 10. Based on this arrangement, it is possible to carry out the automatic processing with high efficiency.

However, when a work program has continuous command blocks of short move quantity, there is a case where even the above numerical value control system cannot obtain a target tool forwarding speed or a target work rotation speed by maintaining sufficient processing precision. Consequently, there is a limit to obtaining more increase in the processing speed of a machine tool.

This invention has been achieved in order to solve the above problems. The invention has an object of providing a numerical value control processing method and a numerical value control system capable of further increasing the processing speed of a machine tool, in the execution of a work program that has continuous command blocks of short move quantity.

DISCLOSURE OF THE INVENTION

This invention can provide a numerical value control system that controls a machine tool, by calculating a move command from a work program or a work data for a numerical value control unit, and directly inputting the move command to a servo control section within the numerical value control unit from the outside of the numerical value control unit, Wherein the numerical value control system comprises at the outside of the numerical value control unit: an analyzing unit which analyzes a work program or a work data; and an interpolating unit which carries out interpolation for each axis in a position control period of the servo control section based on output information from the analyzing unit and cut conditions, whereby the numerical value control system controls a machine tool by directly inputting a move command of a binary format prepared in advance by the interpolating unit, to the servo control section within the numerical value control unit.

Accordingly, at the outside of the numerical value control unit, it is possible to carry out interpolation in a position control period of the servo system shorter than a machine control period of the numerical value control unit. As a result, it is possible to further increase the processing speed of the machine tool, in the execution of a work program that has continuous command blocks of short move quantity.

Further, this invention can provide a numerical value control system that comprises at the outside of the numerical value control unit: a speed information generating unit which generates speed information per unit time in advance by carrying out acceleration/deceleration processing to interpolation data output from the interpolating unit, whereby the numerical value control system controls a machine tool by directly inputting a move command of a binary format including the speed information prepared in advance by the speed information generating unit, to the servo control section within the numerical value control unit.

Accordingly, it is possible to carry out not only the analysis processing of the work program but also the acceleration/deceleration processing, in advance, at the outside of the numerical value control unit. As a result, it is possible to further reduce the load of the numerical value control unit, and it becomes possible to achieve a processing at a faster speed and in higher precision.

Further, this invention can provide a numerical value control system that comprises at the outside of the numerical value control unit: a feed-forwarding unit which absorbs a delay of a servo system in data output from the speed information generating unit, whereby the numerical value control system controls a machine tool by directly inputting a move command of a binary format prepared in advance by the feed-forwarding unit, to the servo control section within the numerical value control unit.

Accordingly, it is possible to carry out not only the analysis processing of the work program and the acceleration/deceleration processing, but also the feed-forward processing, in advance, at the outside of the numerical value control unit. As a result, it is possible to further reduce the load of the numerical value control unit, and it becomes possible to achieve a processing at a faster speed and in higher precision.

Further, this invention can provide a numerical value control system that comprises at the outside of the numerical value control unit: a database unit having a database memory unit for storing a move command in a binary format, cut conditions attached to the binary data, and a work program or a work data for controlling a numerical value that becomes the basis of the binary data, by preparing these data in a database; and a database managing unit which manages the database memory unit, in such a way that the database unit can carry out data communications with the numerical value control unit.

Accordingly, it is possible to manage the binary data, the CAD data that becomes the basis of preparing the binary data, and the cut conditions, in the form of a database. Consequently, it is possible to prepare the binary data from the past cut conditions by inputting only the CAD data for a change in the shape following an alteration of a design. As a result, it is possible to improve the production efficiency of the processing system.

Further, this invention can provide a numerical value control processing method that controls a machine tool, by calculating a move command from a work program or a work data for a numerical value control unit, and directly inputting the move command to a servo control section within the numerical value control unit from the outside of the numerical value control unit, the numerical value control processing method comprising the steps of: analyzing a work program or a work data, and carrying out interpolation for each axis in a position control period of the servo control section based on analysis information and cut conditions, prior to a processing, at the outside of the numerical value control unit; and controlling a machine tool by directly inputting a move command of a binary format prepared in advance by the interpolation calculation, to the servo control section within the numerical value control unit.

Accordingly, at the outside of the numerical value control unit, it is possible to carry out interpolation in advance in a position control period of the servo system shorter than a machine control period of the numerical value control unit. As a result, it is possible to further increase the processing speed of the machine tool, in the execution of a work program that has continuous command blocks of short move quantity.

Further, this invention can provide a numerical value control processing method comprising the steps of: a generating speed information per unit time by carrying out acceleration/deceleration processing to interpolation data prior to a processing, and preparing a move command of a binary format including the speed information prior to a processing, at the outside of the numerical value control unit; and controlling a machine tool by directly inputting the speed information and the move command to the servo control section within the numerical value control unit.

Accordingly, at the outside of the numerical value control unit, it is possible to carry out not only the analysis processing of the work program but also the acceleration/deceleration processing, in advance. As a result, it is possible to further reduce the load of the numerical value control unit, and it becomes possible to achieve a processing at a faster speed and in higher precision.

Further, this invention can provide a numerical value control processing method comprising the steps of: carrying out a feed-forward compensation calculation for absorbing a delay of a servo system in a move command, prior to a processing, at the outside of the numerical value control unit; and controlling a machine tool by directly inputting the feed-forward-compensated move command of a binary format, to the servo control section within the numerical value control unit.

Accordingly, it is possible to carry out not only the analysis processing of the work program and the acceleration/deceleration processing, but also the feed-forward processing, in advance, at the outside of the numerical value control unit. As a result, it is possible to further reduce the load of the numerical value control unit, and it becomes possible to achieve a processing at a faster speed and in higher precision.

Further, this invention can provide a numerical value control system comprising the steps of: storing a database of a move command in a binary format, cut conditions attached to the binary data, and an NC unit work program or a work data that becomes the basis of the binary data, at the outside of the numerical value control unit; and controlling a machine tool by directly inputting the data of the database, to the servo control section within the numerical value control unit.

Accordingly, it is possible to manage the binary data, the CAD data that becomes the basis of preparing the binary data, and the cut conditions, in the form of a database. Consequently, it is possible to prepare the binary data from the past cut conditions by inputting only the CAD data for a change in the shape following an alteration of a design. As a result, it is possible to improve the production efficiency of the processing system.

BRIEF DESCRIPTION OF THE DRAWINGS

FIG. 11 is an explanatory diagram showing an example of a work program that is used in the numerical value control system according to the present invention;

BEST MODE FOR CARRYING OUT THE INVENTION

Figure 1:
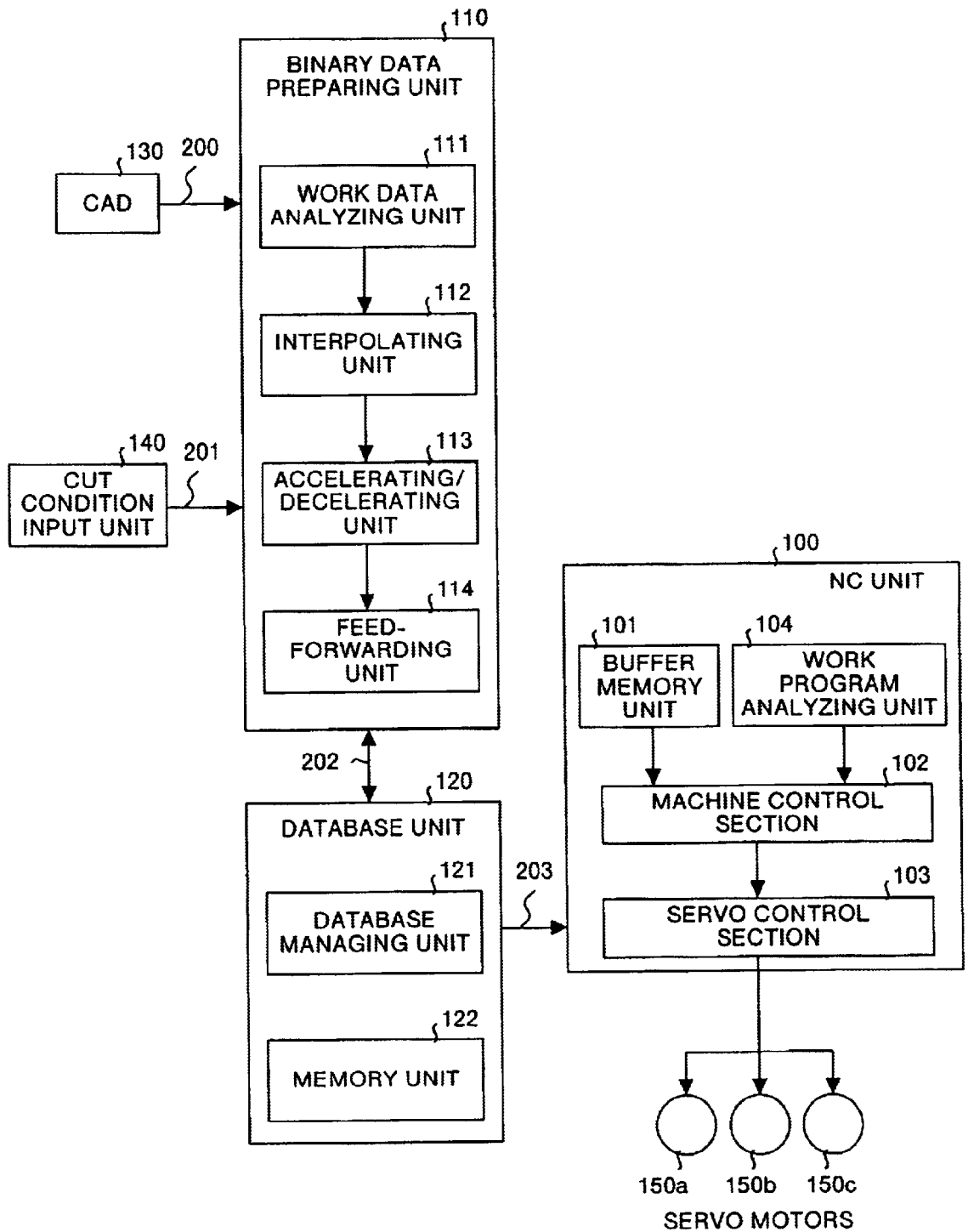
FIG. 1 is a block diagram showing one embodiment of a numerical value control system according to the present invention.

The present invention will be explained in detail below with reference to the attached drawings. FIG. 1 shows one embodiment of a numerical value control system according to the present invention. This numerical value control system has a numerical value control unit 100, a binary data preparing unit 110, and a database unit 120. The numerical value control unit 100 is connected with servo motors 150a, 150b, and 150c of various axes that are operated based on NC work command data.

The binary data preparing unit 110 is connected, via an interface unit 200 and 201, with a CAD system 130 for carrying out preparation and editing of CAD data, and outputting a CAD data following a general format, and a cut condition input unit 140 which inputs cut conditions. The binary data preparing unit 110 processes and converts a high-speed work data from the CAD data that has been output from the CAD system 130. The binary data preparing unit 110 and the database unit 120 are connected to each other via an interface unit 202. The database unit 120 is for storing data prepared by the binary data preparing unit 110. This database unit 120 is connected to the numerical value control unit 100 via an interface unit 203.

The binary data preparing unit 110 is composed of a work data analyzing unit 111 which analyzes a CAD data from the CAD system 130, an interpolating unit 112 which carries out interpolation in each position control period of a servo system, a accelerating/decelerating unit (speed information generating mean) 113 which carries out an acceleration/ deceleration processing to an output result of the interpolating unit 112, and generating speed information per unit time in advance, and a feedforwarding unit 114 which carries out a feed-forward compensation for absorbing a delay of a servo system in an output result of the accelerating/decelerating unit 113.

The database unit 120 has a database managing unit 121 and a memory unit (an external memory unit) 122. The database unit 120 stores data prepared by the binary data preparing unit 110, into the memory unit 122 based on the operation of the database managing unit 121. In other words, the database unit 120 prepares a database of a move command in a binary format, cut conditions attached to the binary data, and an NC unit work program or a work data that becomes the basis of the binary data, and stores this database at the outside of the numerical value control unit. The database unit 120 can give the data of the database directly to a servo control section 103 within the numerical value control unit 100.

The numerical value control unit 100 is composed of a buffer memory unit 101 which stores an output data from the database unit 120 into the memory via the interface unit 203, a machine control section 102 for managing the data within the buffer memory unit 101 and delivering the data to the next processing, and the servo control section 103 for controlling the servo system based on the data delivered from the machine control section 102. The numerical value control unit 100 can also have a normal work program analyzing unit 104.

In the normal processing, there are sequentially carried out a work program analysis processing, a machine control processing, and a servo control processing, thereby to execute the servo control of motors. However, according to the numerical value control system having the above structure, the binary data prepared by the binary data preparing unit 110 can be directly delivered to the servo control section 103 from the database unit 120 via the buffer memory unit 101 and the machine control section 102 within the numerical value control unit 100, thereby to carry out the servo control of the servo motors 150a, 150b, and 150c.

Next, the operation of the numerical value control system and the numerical value control processing method according to the present invention will be explained with reference to FIG. 2 to FIG. 12.

Figure 2:
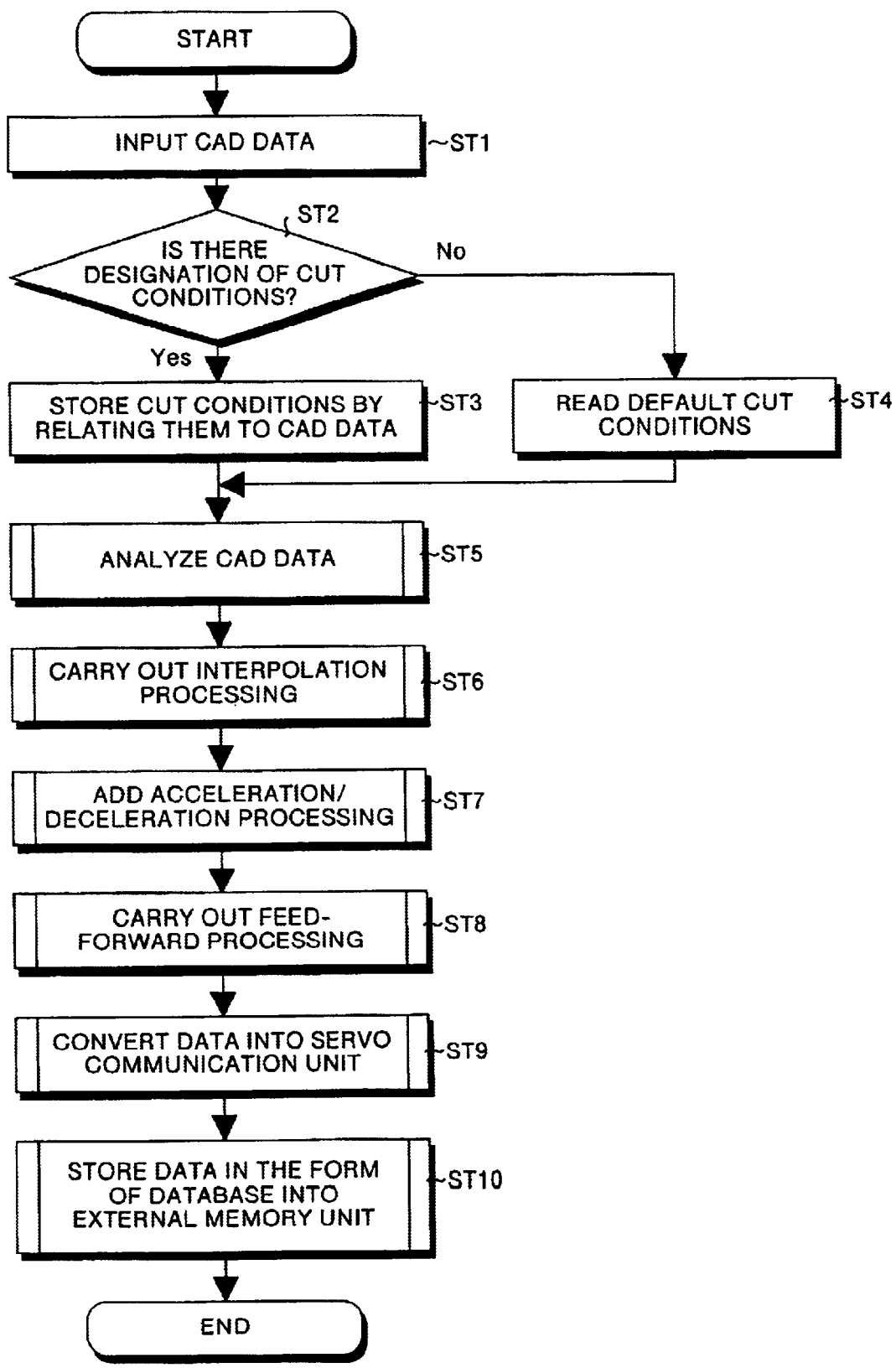
FIG. 2 is a flowchart showing a binary conversion processing in the numerical value control system according to the present invention.
Figure 6:
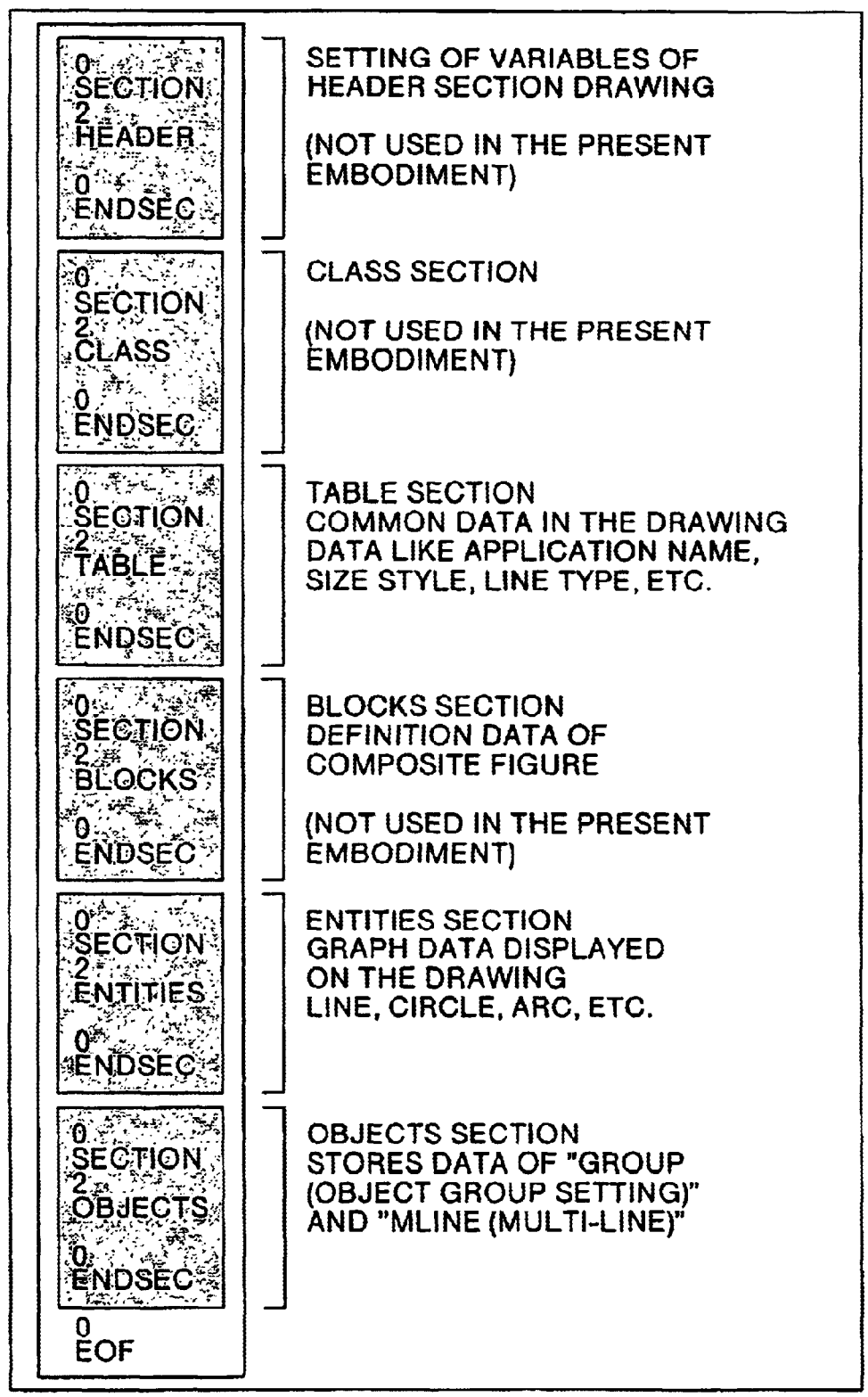
FIG. 6 is an explanatory diagram showing an example of a drawing data format that is used in the numerical value control system according to the present invention.

When the CAD data of a general DXF format file as shown in FIG. 6 has been input to the binary data preparing unit 110 as an output format of a two-dimensional CAD system, the binary data preparing unit 110 carries out a binary data preparation processing as shown in FIG. 2, and stores a move command in the database unit 120.

The binary data preparing unit 110 inputs the CAD data (step ST1), and checks presence or absence of an input of cut conditions from the cut condition input unit 140 (step ST2). When there has been an input of cut conditions, the binary data preparing unit 110 writes the cut conditions into the database unit 120 by relating the cut conditions to the CAD data (step ST3) On the other hand, when it has been decided that there has been no input of cut conditions, the binary data preparing unit 110 reads default cut conditions relevant to the CAD data from the database unit 120 (step ST4).

Next, the binary data preparing unit 110 extracts mainly a shape data of the ENTITIES section in the CAD data, by checking the presence or absence of contradiction in the CAD data described in the DXF format as shown in FIG. 6, and delivers data group at a start point and an end point to the interpolating unit 112 (step ST5).

Next, the interpolating unit 112 carries out an interpolation processing based on the extracted shape data a figure, and cut conditions like a rotation speed of a main axis, a tool forwarding speed, etc. (step ST6).

Figure 7:
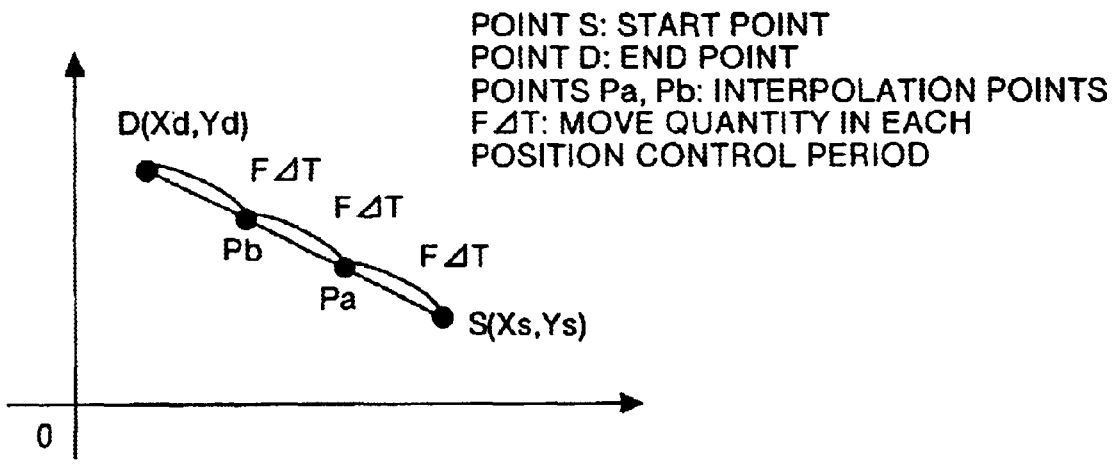
FIG. 7 is a graph showing an example of an interpolation processing.

For the interpolation processing, various kinds of processing are carried out depending on the types of interpolation and the setting of a coordinate system. FIG. 7 shows an example of an interpolation processing for connecting between two points of a start point and an end point provided from the CAD data. In this case, it is assumed that a start point S and an end point D are given from the CAD data, and a tool forwarding speed is given as a cut condition, and that a world coordinate origin of the CAD data is handled as a program origin.

As shown in FIG. 7, the interpolation processing is carried out by obtaining a cross point between a straight line connecting between the start point S and the end point D, and a circle obtained by using, as a radius value, a move quantity FΔT per position control period (for example ¼500 ms) of the servo control section 103 from the given tool forwarding speed. A straight line that connects between the two points of the start point S (Xs, Ys) and the end point D (Xd, Yd) can be expressed by the following equation (1).

$$Y-Ys=(Yd-Ys/Xd-Xs)(X-Xs) \quad (1)$$

Further, a position of the move quantity FΔT from the processing start point (Xs, Ys) can be expressed by the following equation (2).

$$(X-Xs)^2+(Y-ys)^2=F\Delta T^2 \quad (2)$$

Two solutions P1 and P2 are obtained from the equations (1) and (2). An end-point interpolation point Pa is obtained that is on the line SD, and that satisfies a condition that a direction from S to D coincides with a direction from P1 to P2 or a direction from P2 to P1. The next interpolation point Pb is similarly obtained as a cross point between a straight line and a circle having a radius FΔT with the interpolation Pa as a center. After finishing the analysis of the interpolation points of the figure, a speed command pulse is distributed to each axis. Thereafter, the next interpolation point is obtained by using the interpolation point obtained this time as a center of a circle. This process is continued until the end-point coordinates are exceeded.

Next, the accelerating/decelerating unit 113 has the speed command pulse distributed to each axis as an input, and carries out an acceleration/deceleration processing to the speed command, when there is a variation in the contents of the speed command (step ST7). The feedforwarding unit 114 carries out a feed-forward processing based on the speed command pulse generated by the accelerating/decelerating unit 113 (step ST8).

Figure 8:
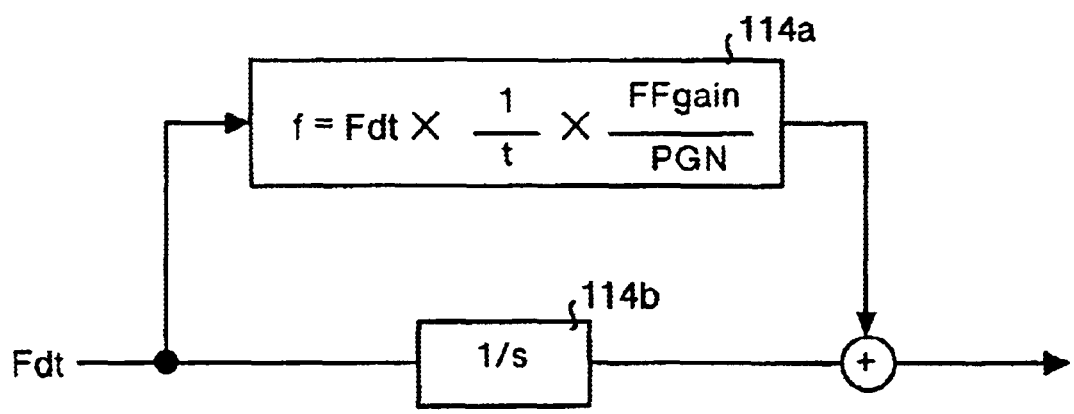
FIG. 8 is a block diagram showing an internal structure of a feedforwarding unit.

The feed-forward processing is for feedforwarding a position loop in order to minimize a shape error due to a race delay of a servo system. In other words, a position command is differentiated for each position control period, and a feed-forward coefficient is multiplied to this differential value. Then, a value obtained by this multiplication is added to the command, and a result is output. Specifically, a calculator 114*a* as shown in FIG. 8 carries out the calculation based on the equation (3).

$$f=Fdt(1/t)(FFgain/PGN) \quad (3)$$

In the equation (3), Fdt represents speed information generated by the acceleration/deceleration processing, and t represents a position control period of the servo control section 103. A feed-forwardgain FFgain and a position loop gain PGN are set by parameters. In FIG. 8, 1/s denotes an integrator 114*b*.

Next, a result of step ST1 to step ST8 is converted into binary data (refer to FIG. 9) for each communication with the servo control section 103 of the numerical value control unit 100 (step ST9). This binary data is stored into the memory unit 122 of the database unit 120 (step ST10). When the data is stored in the memory unit 122 of the database unit 120, it becomes easy to manage the data by relating the cut conditions that become the basis of the binary data to the CAD data.

The above binary data preparation processing is carried out prior to the processing, and the data is stored into the database unit 120.

Figure 12:
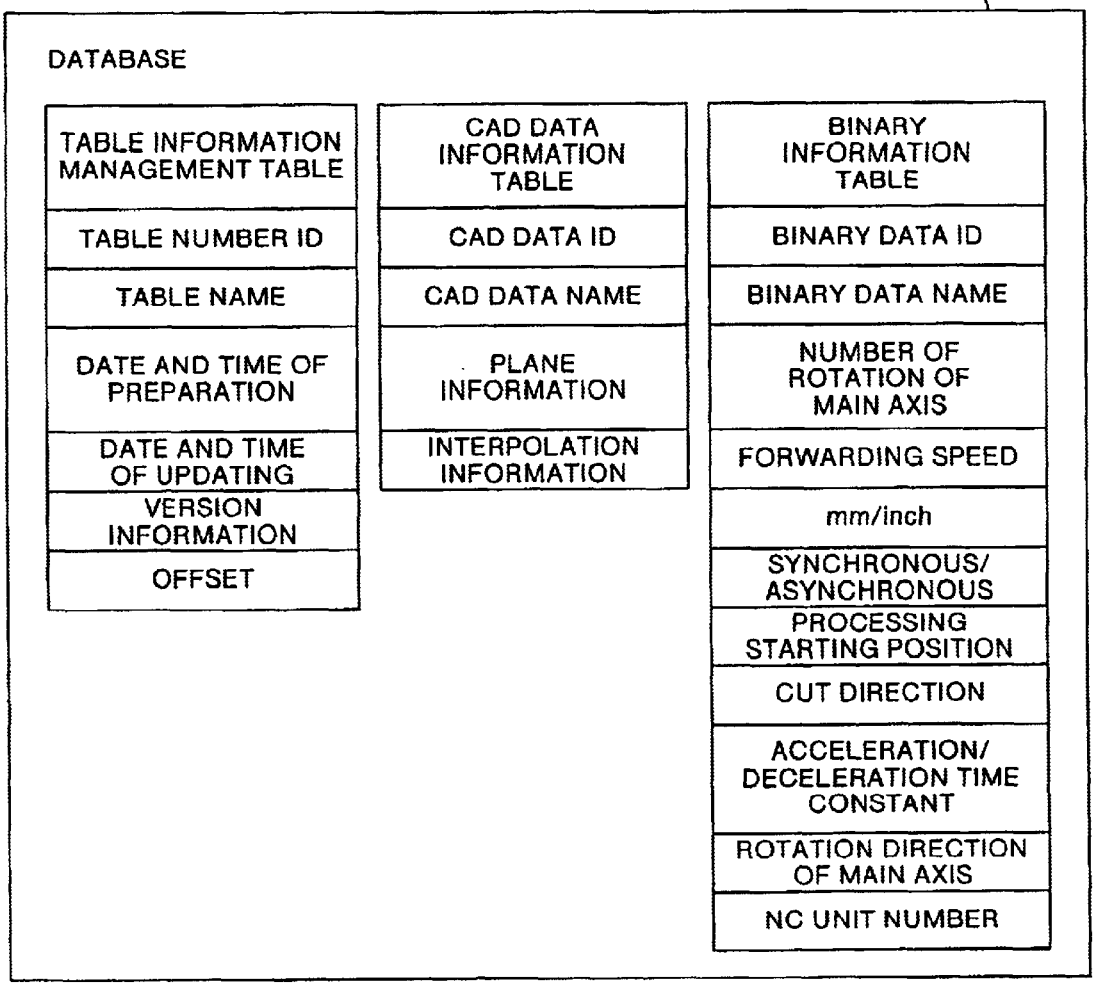
FIG. 12 is an explanatory diagram showing a database structure of a database unit in the numerical value control system according to the present invention.
Figure 13:
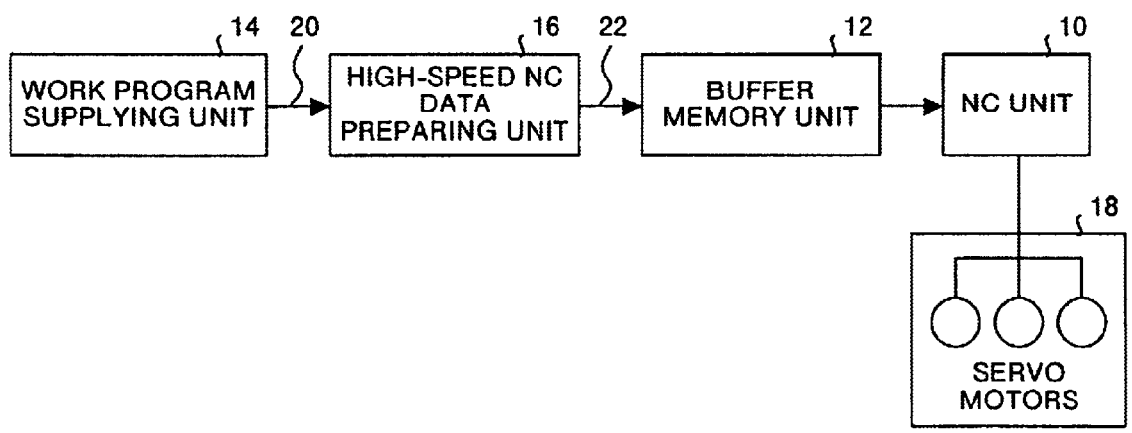
FIG. 13 is a block diagram showing a conventional example.
Figure 14:
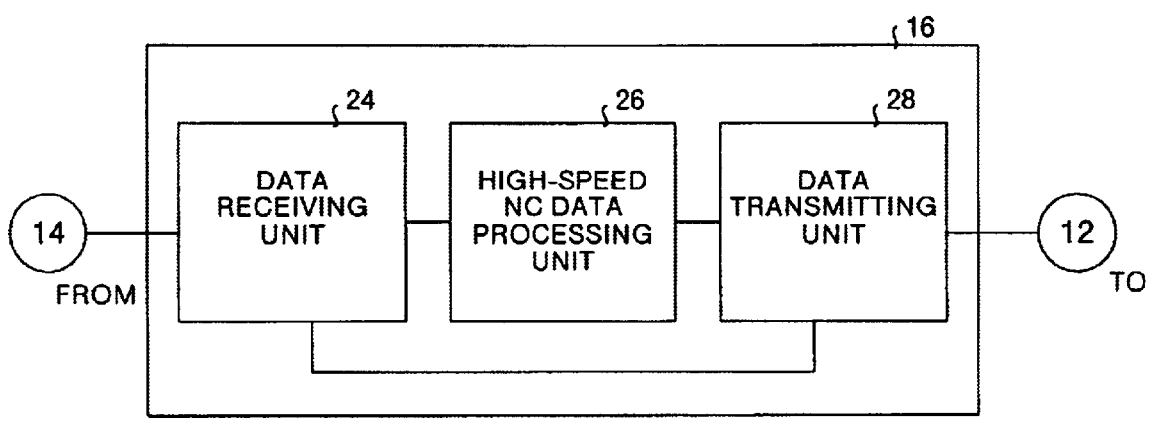
FIG. 14 is a block diagram showing an internal structure of a high-speed NC data preparing unit as a conventional example.

The database unit 120 builds up a database in the memory unit 1 like a hard disk at the outside of the numerical value control unit. FIG. 12 shows an example of a structure of a database in the present embodiment. The database managing unit 121 realizes the operation of the database in the memory unit 122. The database managing unit 121 has a data input/output function and a backup function of the numerical value control unit 100 and the like.

FIG. 11 shows a work program for calling a binary data obtained at step ST9. This program is stored into the memory within the numerical value control unit 100 in advance. A program number designated by a command format "G65 P program number, R1" described in this work program is read from the memory unit 122 of the database unit 120, and is stored into the buffer memory unit 101 within the numerical value control unit 100. One binary data file is divided into many blocks, and these blocks are sequentially written into the buffer memory unit 101 of the numerical value control unit 100 from the memory unit 122 of the database unit 120 via the interface unit 203 in the data format as shown in FIG. 9.

Figure 9:
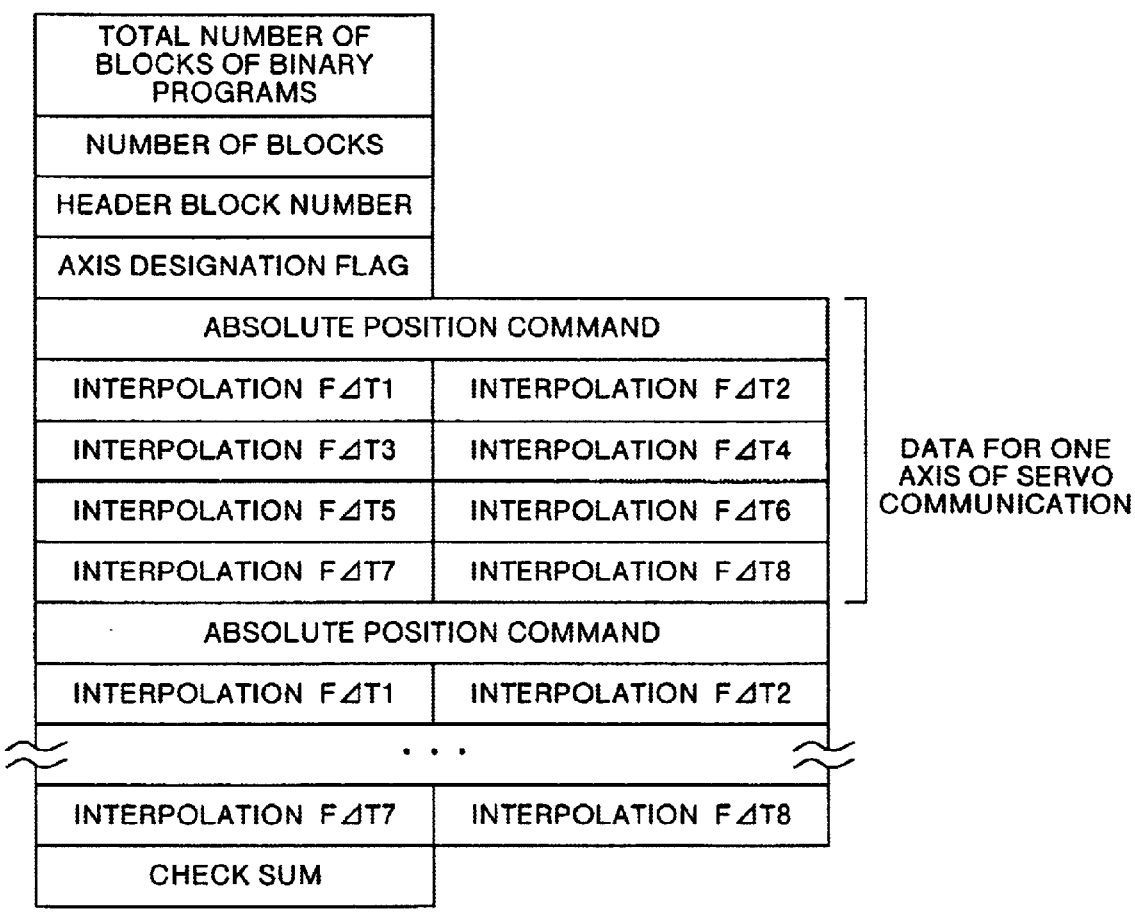
FIG. 9 is an explanatory diagram showing a structure (a data format) of binary data that is used in the numerical value control system according to the present invention.

According to the data format shown in FIG. 9, a total number of blocks of a binary data file is stored in the header. In the next address, there are stored a number of blocks that are transmitted for communications this time, and a block number (a header block number) that shows the order of a block that is first transmitted in the whole blocks.

In this case, the number of blocks shows blocks of data that are transmitted one time in servo communication unit.

Figure 10:
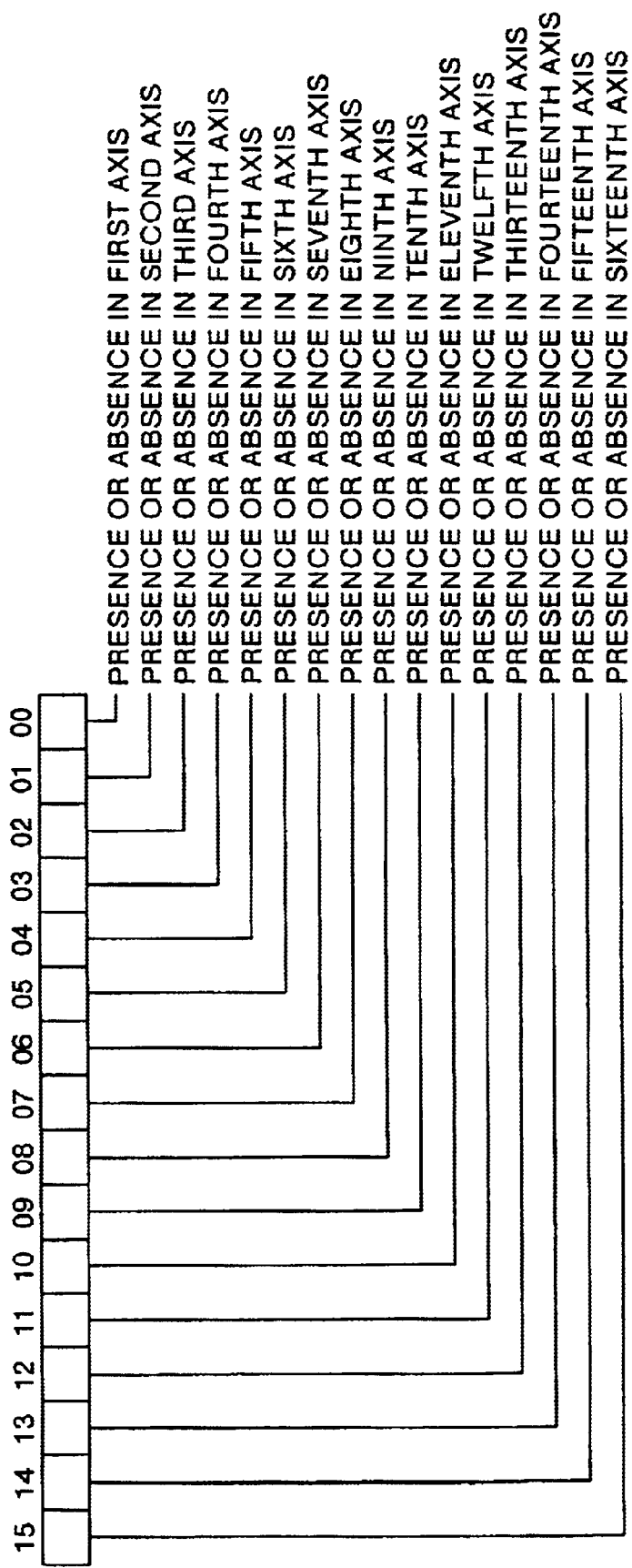
FIG. 10 is an explanatory diagram showing an example of a structure of an axis designation flag.

In the next address, there is stored an axis designation flag that shows an axis to which a command is given out of the axes actually connected to the servo system. The axis designation flag has data in bit unit as shown in FIG. 10. The axis designation flag stores information from bit 0 of a first axis to bit 15 of a sixteenth axis. When a bit is on, this shows that there exists a command for this axis.

For example, when bit 0 and bit 2 are on, this shows that command data in servo communication unit following the axis designation flag are stored in the order of the first axis and the third axis. Lastly, the above data are added in two-byte unit, and one is added to this sum. Then, the lower two bytes of this data are stored. Thus, a check sum for checking whether the communications have been carried out normally or not is stored.

Figure 3:
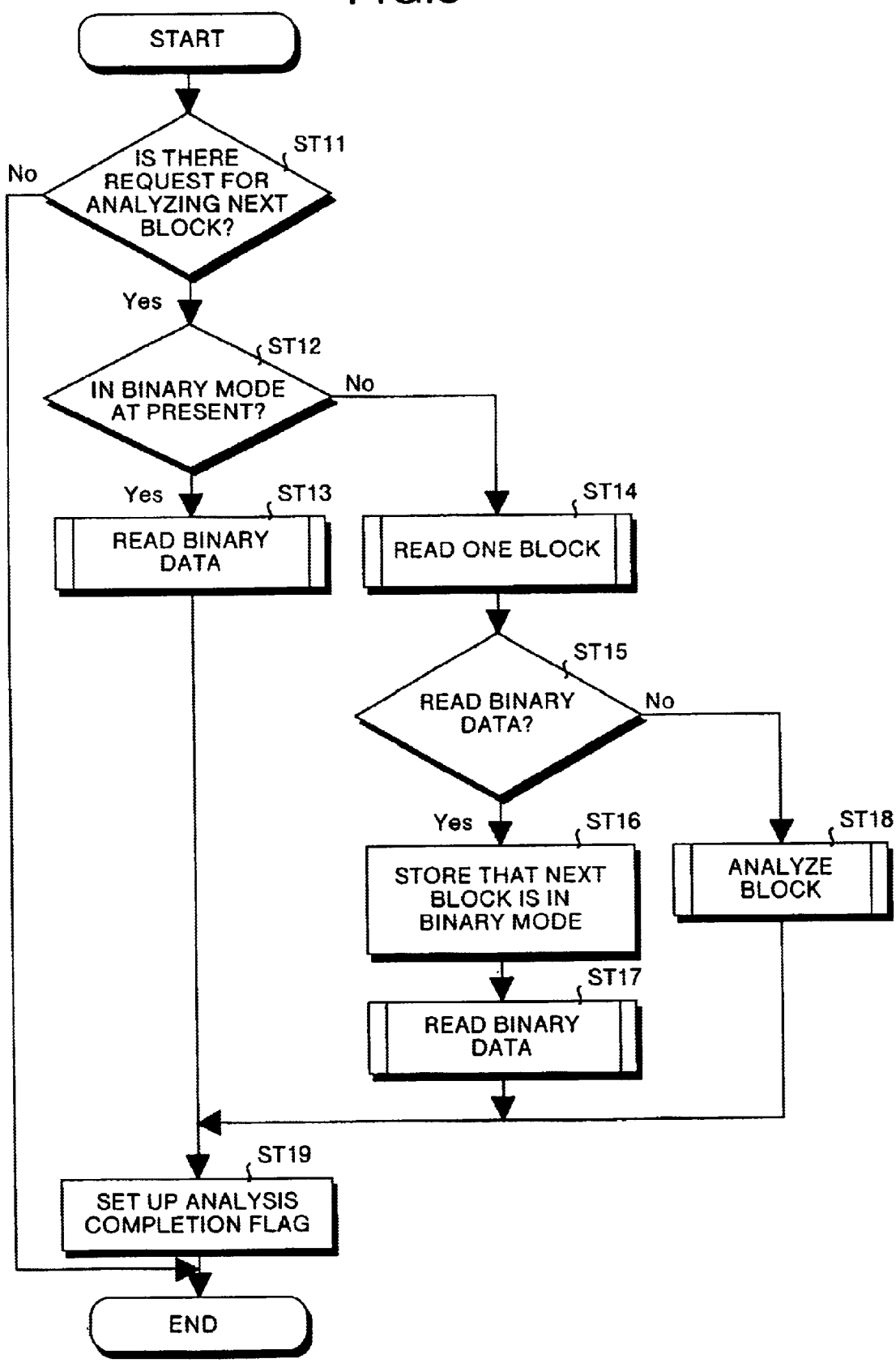
FIG. 3 is a flowchart showing an analysis processing corresponding to a binary data reading in the numerical value control system according to the present invention.

FIG. 3 shows an analysis processing flow for analyzing a command block described in the work program. First, a decision is made about whether there is a request for analyzing the next block from the machine control section 102 or not (step ST11). When there is no request for analyzing the next block, the processing is finished. On the other hand, when there is a request for analyzing the next block, a decision is made about whether a control is currently being carried out in binary data or not (step ST12)

When a control is currently being carried out in binary data, a binary data read processing is carried out (step ST13). When a control based on a normal work program is currently being carried out, the next block is read (step ST14), and it is checked whether the next block is an input code for calling a binary program or not (step ST15). When the next block is an input code for calling a binary program, the fact that the next block is in the binary mode is stored (step ST16), and a binary data read processing is carried out (step ST17). On the other hand, when the next block is an input code other than a binary program call request, a block analysis processing for analyzing a normal work program is carried out (step ST18). After the above processing has been finished, a flag that shows the completion of the analysis is set up (step ST19), and the processing is finished.

Figure 4:
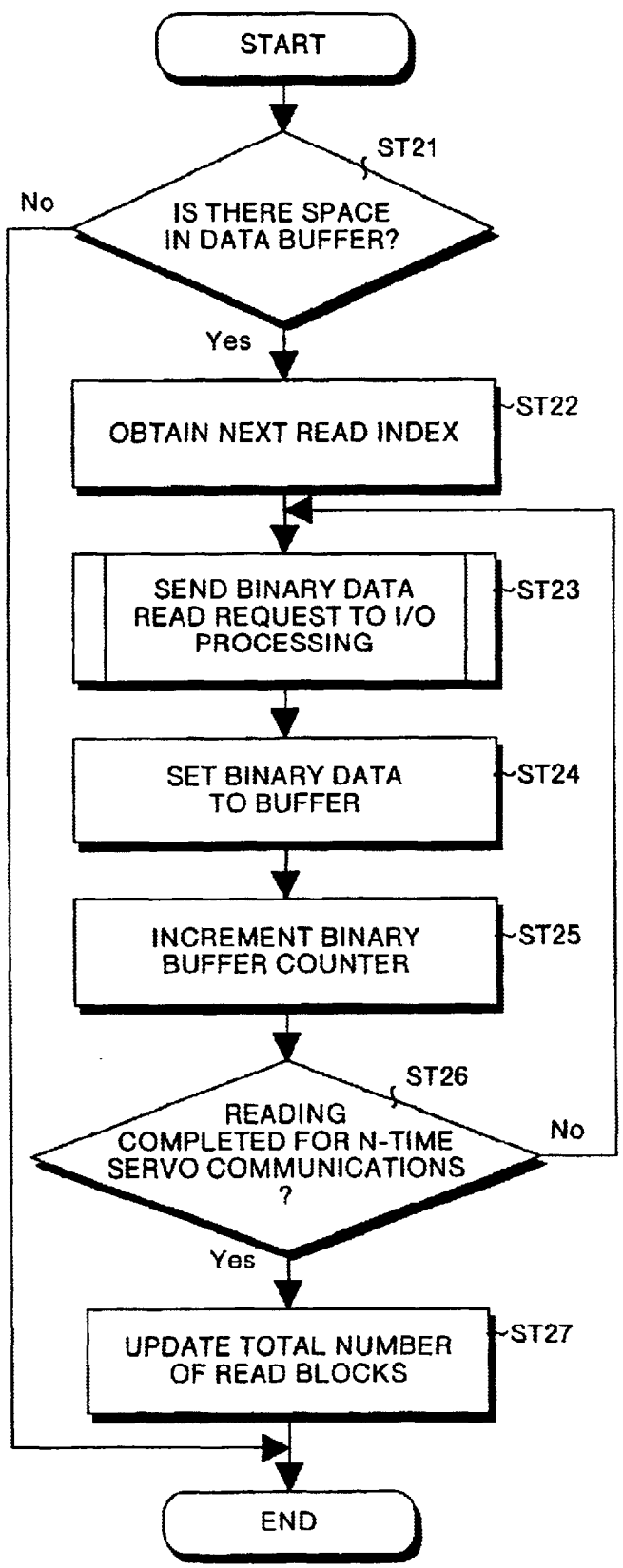
FIG. 4 is a flowchart of a binary data reading in the numerical value control system according to the present invention.

Next, the binary program read processing will be explained with reference to FIG. 4. Firstly, it is checked whether a space exists in the high-speed processing buffer memory unit 101 or not (step ST21). When there exists no space, no processing is carried out until when the machine control section 102 has consumed the data. When a space exists in the buffer memory unit 101, the block number read last time is updated, thereby to obtain the next read index (step ST22). When a block is to be read for the first, the block number is initialized to 1. On the other hand, when the reading of blocks has already been in progress, the last-read block number is updated to the next block number.

Next, based on the updated block number, the binary data as shown in FIG. 9 is input via the interface unit 203 (step ST23). The input binary data is stored into the high-speed processing buffer memory unit 101 (step ST24).

Next, the number of blocks that have been stored into the buffer memory unit 101 is updated. In other words, the binary buffer counter is incremented (step ST25). Next, it is checked whether or not there exists in the buffer memory unit 101 data that is N times the quantity of data that are servo-communicated in one processing period of the machine control section 101 (step ST26). In this case, the N value is determined based on a relationship between the time required for storing the binary data from the memory unit 22 of the database unit 120 into the buffer memory unit 101 within the numerical value control unit 100, and the binary data consumption time. When the communication time between the database unit 120 and the buffer memory unit 101 is slow and the data consumption in the machine control section 102 is fast, the N value is set large. Last, the number of blocks that have been read up to the present is updated (step ST27), and the processing is finished.

Figure 5:
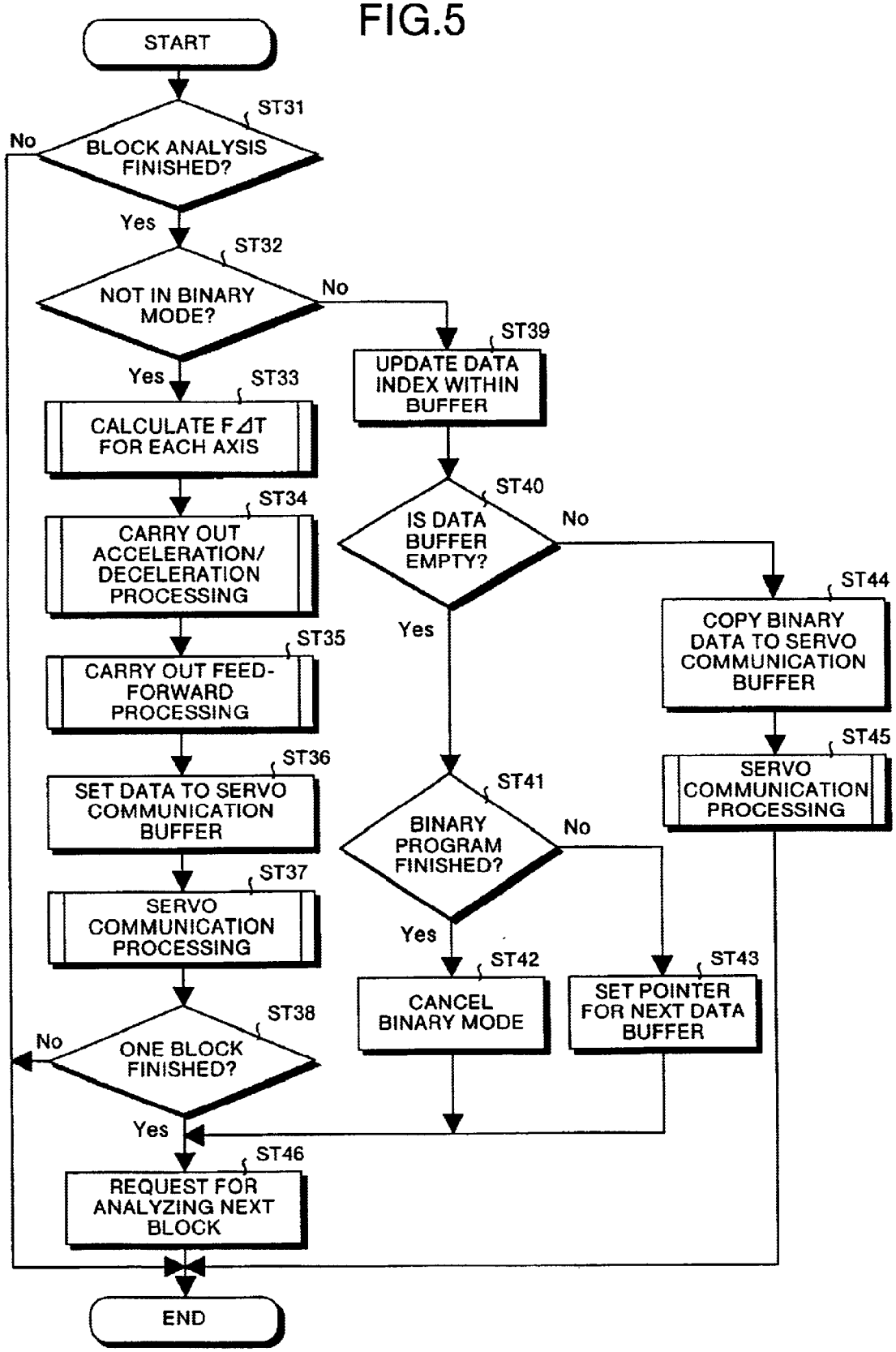
FIG. 5 is a flowchart of a machine control processing corresponding to a binary data in the numerical value control system according to the present invention.

FIG. 5 shows a machine control processing flow of the machine control section 102. First, it is checked whether the block analysis has been finished or not (step ST31). When the block analysis has not been finished, the next processing is waited until when the analysis has been finished. When the block analysis has been finished, it is checked whether the machine control is being carried out based on a binary program or not (step ST32). When a control based on a normal processing is being carried out instead of a control based on a binary program, a processing of obtaining a move quantity FAT per unit time for each axis is carried out (step ST33). A linear acceleration/deceleration processing is carried out based on the obtained move quantity FAT (step ST34). Thereafter, a feed-forward processing is carried out (step ST35). After the data has been converted into an absolute position format data as an integration value of the move quantity FΔT, the data is set to a servo communication buffer (step ST36). Then, a communication processing for issuing an absolute position command to the servo control section 103 is carried out (step ST37).

When the fact of a binary mode has been stored in the analysis processing, the process proceeds to the binary program processing. In this case, a block number (a data index) of binary data to be delivered to the servo control section 103 is updated (step ST39), and it is confirmed whether the binary data in the buffer memory unit 101 has been finished or not. In other words, it is confirmed whether the buffer memory unit 101 is empty or not (step ST40). When the buffer memory unit 101 is not empty, the binary data is copied into a servo communication transmission buffer (step ST44), and a servo communication processing is carried out (step ST45). In this case, in the communications carried out with the servo control section 103, not only the absolute position command but also the move quantity obtained by interpolating the move quantity up to the absolute position in the position control period of the servo control section 103 is transmitted.

When the buffer memory unit 101 is empty, it is checked whether the binary program has been finished or not (step ST41). When the binary program has been finished, the binary mode is canceled (step ST42), and a request for analyzing the next block is issued (step ST46). On the other hand, when the binary program continues, the pointer is updated to the next data buffer storage destination pointer (step ST43). In order to read new binary data, the request for analyzing the next block is set up (step ST46), and the binary data is set up in the analysis processing.

As explained above, the binary data are sequentially stored into the buffer memory unit 101 from the database unit 120. The machine control section 102 for carrying out the interpolation processing and the acceleration/deceleration processing only outputs the binary data to the servo system, and executes little processing. Therefore, it is possible to reduce the load of the numerical value control unit 100, and it becomes possible to improve the processing capacity of the numerical value control unit 100. Further, as the binary data prepared in advance in the position control period of the servo system shorter than the interpolation period of the machine control section 102 is used, it becomes possible to carry out a high-precision processing.

Further, as the feed-forward processing is also carried out in advance at the outside of the numerical value control unit, the load of the numerical value control unit 100 is further reduced, and it becomes possible to carry out a high-speed processing in high precision. Further, it is possible to manage the binary data, the CAD data that becomes the basis of preparing the binary data, and the cut conditions, in the form of a database. Consequently, it is possible to prepare the binary data from the past cut conditions by inputting only the CAD data for a change in the shape following an alteration of a design. As a result, it is possible to improve the production efficiency of the processing system.

In the present embodiment, the input code of a binary program is expressed in the code as shown in FIG. 11. However, the input code of a binary program is not particularly limited to this, and it is also possible to allocate other input code. Further, the data format of the database unit 120 and the numerical value control unit 100 is not limited to the one as shown in FIG. 9, and it is also possible to change the data format according to the needs. Further, the data is not limited to the plane data (CAD data) as shown in FIG. 6, and it is also possible to process the data to other work program or work data.

Industrial Applicability

It is possible to utilize the numerical value control system and the numerical value control processing method according to the present invention to numerical value control of various kinds of machine tools.

What is claimed is:

1. A numerical value control system that controls a machine tool, by calculating a move command from a work program or a work data for a numerical value control unit, the numerical value control system comprising:

servo motors for controlling movements of the machine tool;

a binary data preparing unit that includes a work data analyzing unit for analyzing a program or a data including a CAD (Computer Aided Design) program or a CAD data, an interpolating unit for carrying out interpolation for each axis based on output information from the analyzing unit and cut conditions, an accelerating/decelerating unit for generating speed information per unit time in advance by processing an output of the interpolating unit, and a feed-forwarding unit for carrying out feed-forward compensation to an output of the acceleration/deceleration unit;

a database unit that includes a memory unit for storing data prepared by the binary data preparing unit; and an NC unit that includes a buffer memory unit for storing an output data from the database unit, a machine control section for managing and delivering the data within the buffer memory unit, a servo control section for controlling the servo motors based on the data delivered from the machine control section, and a work program analyzing unit for analyzing a work program, wherein the machine control section is configured to be capable of using the data including a move command of a binary format prepared in advance and stored in the database unit, instead of analyzing a work program at the work program analyzing unit.

2. The numerical value control system according to claim 1, wherein the numerical value control system comprises at the outside of the numerical value control unit: a speed information generating unit which generates speed information per unit time in advance by carrying out acceleration/deceleration processing to interpolation data output from the interpolating unit, whereby the numerical value control system controls a machine tool by directly inputting a move command of a binary format including the speed information prepared in advance by the speed information generating unit, to the servo control section within the numerical value control unit.

3. The numerical value control system according to claim 2, wherein the numerical value control system comprises at the outside of the numerical value control unit: a feedforwarding unit which absorbs a delay of a servo system in data output from the speed information generating unit, whereby the numerical value control system controls a machine tool by directly inputting a move command of a binary format prepared in advance by the feedforwarding unit, to the servo control section within the numerical value control unit.

4. The numerical value control system according to claim 1, wherein the numerical value control system comprises at the outside of the numerical value control unit: a database unit having a database memory unit for storing a move command in a binary format, cut conditions attached to the binary data, and a work program or a work data for controlling a numerical value that becomes the basis of the binary data, by preparing these data in a database; and database managing unit which manages the database memory unit, in such a way that the database unit can carry out data communications with the numerical value control unit.

5. A numerical value control processing method that controls a machine tool, by calculating a move command from a work program or a work data for a numerical value control unit, numerical value control processing method comprising the steps of:

preparing a binary data by analyzing a program or a data including a CAD (Computer Aided Design) program or a CAD data, carrying out interpolation for each axis based on analysis information and cut conditions, generating speed information per unit time in advance by processing an output of the interpolation, and carrying out feed-forward compensation to the generated speed information;

storing the binary data including a move command of a binary format prepared in advance; and controlling a machine tool by using the stored binary data, without analyzing the work program at the same time.

6. The numerical value control processing method according to claim 5, comprising the steps of: generating speed information per unit time by carrying out acceleration/deceleration processing to interpolation data prior to a processing, and preparing a move command of a binary format including the speed information prior to a processing, at the outside of the numerical value control unit; and controlling a machine tool by directly inputting the speed information and the move command to the servo control section within the numerical value control unit.

7. The numerical value control processing method according to claim 5, comprising the steps of: carrying out a feed-forward compensation calculation for absorbing a delay of a servo system in a move command, prior to a processing, at the outside of the numerical value control unit; and controlling a machine tool by directly inputting the feed-forward-compensated move command of a binary format, to the servo control section within the numerical value control unit.

8. The numerical value control processing method according to claim 5, comprising the steps of: storing a database of a move command in a binary format, cut conditions attached to the binary data, and an NC unit work program or a work data that becomes the basis of the binary data, at the outside of the numerical value control unit; and controlling a machine tool by directly inputting the data of the database, to the servo control section within the numerical value control unit.

* * * * *